United States Patent
Driscoll et al.

(10) Patent No.: US 7,485,272 B2
(45) Date of Patent: Feb. 3, 2009

(54) MULTI-STAGE SYSTEM FOR SELECTIVE CATALYTIC REDUCTION

(75) Inventors: James Joshua Driscoll, Dunlap, IL (US); David M. Milam, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 296 days.

(21) Appl. No.: 11/290,730

(22) Filed: Nov. 30, 2005

(65) Prior Publication Data
US 2007/0122317 A1    May 31, 2007

(51) Int. Cl.
| | |
|---|---|
| B01D 53/56 | (2006.01) |
| B01D 53/90 | (2006.01) |
| B01D 53/94 | (2006.01) |
| F01N 3/08 | (2006.01) |
| F01N 3/10 | (2006.01) |
| F01N 3/18 | (2006.01) |
| F01N 3/20 | (2006.01) |

(52) U.S. Cl. ............. 423/213.2; 423/213.7; 423/239.1; 423/DIG. 5; 422/105; 422/108; 422/111; 422/170; 422/171; 422/172; 422/177; 422/180; 60/274; 60/282; 60/299; 60/301

(58) Field of Classification Search ............ 423/213.2, 423/213.7, 239.1, DIG. 5; 422/105, 108, 422/111, 170, 171, 172, 177, 180; 60/274, 60/282, 299, 301
See application file for complete search history.

(56) References Cited

U.S. PATENT DOCUMENTS

| | | |
|---|---|---|
| 5,047,220 A | 9/1991 | Polcer |
| 5,628,186 A | 5/1997 | Schmelz |
| 5,714,130 A | 2/1998 | Saito et al. |
| 5,746,052 A | 5/1998 | Kinugasa et al. |
| 5,950,422 A | 9/1999 | Dölling |
| 5,964,088 A | 10/1999 | Kinugasa et al. |
| 6,047,542 A | 4/2000 | Kinugasa et al. |
| 6,048,510 A | 4/2000 | Zauderer |
| 6,063,350 A | 5/2000 | Tarabulski et al. |

(Continued)

FOREIGN PATENT DOCUMENTS

EP    0 802 315 A2    10/1997

(Continued)

OTHER PUBLICATIONS

PCT International Search Report; PCT/US2006/039669; International Filling Date: Oct. 10, 2006; Applicant: Caterpillar Inc.

*Primary Examiner*—Timothy C Vanoy
(74) *Attorney, Agent, or Firm*—Finnegan, Henderson, Farabow, Garrett & Dunner

(57) ABSTRACT

A first aspect of the present disclosure includes a method of controlling nitric oxides emissions. The method may include producing an exhaust gas stream containing NOx and supplying the exhaust gas stream to an exhaust passage. The method may further comprise supplying ammonia to the exhaust passage at a location upstream of a first selective catalytic reduction catalyst, wherein the amount of ammonia supplied at the first location is less than about 90% of the effective amount of ammonia needed for reduction of all NOx at the first location. Further, ammonia may be supplied to the exhaust passage at a second location downstream of the first selective catalytic reduction catalyst and upstream of a second selective catalytic reduction catalyst.

17 Claims, 4 Drawing Sheets

U.S. PATENT DOCUMENTS

| | | |
|---|---|---|
| 6,092,367 A | 7/2000 | Dölling |
| 6,109,024 A | 8/2000 | Kinugasa et al. |
| 6,119,452 A | 9/2000 | Kinugasa et al. |
| 6,122,910 A | 9/2000 | Hoshi et al. |
| 6,125,629 A | 10/2000 | Patchett |
| 6,128,898 A | 10/2000 | Sakurai et al. |
| 6,133,185 A | 10/2000 | Kinugasa et al. |
| 6,146,605 A | 11/2000 | Spokoyny |
| 6,176,079 B1 | 1/2001 | Konrad et al. |
| 6,269,633 B1 | 8/2001 | van Nieuwstadt et al. |
| 6,289,672 B1 | 9/2001 | Katoh et al. |
| 6,334,986 B2 | 1/2002 | Gieshoff et al. |
| 6,338,244 B1 | 1/2002 | Guenther et al. |
| 6,345,496 B1 | 2/2002 | Fuwa et al. |
| 6,403,046 B1 | 6/2002 | Spokoyny |
| 6,415,602 B1 | 7/2002 | Patchett et al. |
| 6,422,005 B2 | 7/2002 | Dölling et al. |
| 6,470,673 B1 | 10/2002 | van Nieuwstadt et al. |
| 6,475,453 B1 | 11/2002 | Mathes et al. |
| 6,662,552 B1 | 12/2003 | Gunther et al. |
| 6,732,507 B1 | 5/2004 | Stanglmaier |
| 6,739,125 B1 | 5/2004 | Mulligan |
| 6,833,272 B1 | 12/2004 | Binder et al. |
| 6,878,359 B1 * | 4/2005 | Mathes et al. ............ 423/239.1 |
| 2001/0014298 A1 | 8/2001 | Neufert |
| 2002/0102197 A1 | 8/2002 | Cooper et al. |
| 2002/0148220 A1 | 10/2002 | Patchett et al. |
| 2003/0109047 A1 | 6/2003 | Valentine |
| 2004/0076565 A1 | 4/2004 | Gandhi et al. |
| 2004/0118109 A1 | 6/2004 | Gladden |
| 2004/0126286 A1 | 7/2004 | deRuyter |
| 2004/0159096 A1 | 8/2004 | Yasui et al. |
| 2005/0000220 A1 | 1/2005 | Zauderer |
| 2005/0008547 A1 | 1/2005 | Kikawa et al. |
| 2005/0284134 A1 | 12/2005 | Radhamohan et al. |

FOREIGN PATENT DOCUMENTS

| | | |
|---|---|---|
| EP | 0 814 241 A1 | 12/1997 |
| WO | WO 87/02025 | 4/1987 |
| WO | WO 98/28070 | 7/1998 |
| WO | WO 2004/058642 A1 | 7/2004 |

* cited by examiner

MULTI-STAGE SYSTEM FOR SELECTIVE CATALYTIC REDUCTION

TECHNICAL FIELD

This disclosure pertains generally to exhaust-gas purification systems, and more particularly, to selective catalytic reduction systems with multiple catalysts.

BACKGROUND

Selective catalytic reduction (SCR) provides a method for removing nitrogen oxides (NOx) emissions from fossil fuel powered systems for engines, factories, and power plants. During SCR, a catalyst facilitates a reaction between exhaust ammonia and NOx to produce water and nitrogen gas, thereby removing NOx from the exhaust gas. Generally, the exhaust gas ammonia is mixed with an exhaust gas stream upstream of an SCR catalyst. The ammonia may be supplied directly into the exhaust gas stream or provided as urea, which can be converted to ammonia under appropriate conditions.

To optimize NOx removal from the exhaust gas stream, while preventing release of potentially noxious ammonia or urea, the NOx and ammonia are generally supplied at approximately one-to-one ratios. However, it may be difficult to match the quantities of ammonia and NOx flowing into the SCR system. Further, even when the ratios are perfectly matched, some of the NOx may not be reduced due to inadequate mixing, short exhaust gas transit times, or sub-optimal catalyst operating conditions. Therefore, improved SCR systems that provide better NOx removal are needed.

One system for controlling NOx emissions is disclosed in patent publication WO 2004/058642, which was filed by Valentine on Dec. 17, 2003 (hereinafter the '642 publication). The '642 publication provides a multi-stage NOx reduction system. The system may include multiple catalysts effective at different temperature ranges and having injectors associated with each.

While the system of the '642 publication may provide suitable NOx-emissions control for some applications, the system of the '642 publication may have several drawbacks. For example, the system of the '642 publication may require on-board storage of reductants, which may require significant space and may be hazardous. Further, the system of the '642 publication may use more reductant than is needed, thereby wasting chemicals and potentially releasing the reductant into the environment. Further, the system of the '642 publication may not provide optimum NOx-emissions control for some applications.

The present disclosure is directed at overcoming one or more of the shortcomings of the prior art NOx-emissions control systems.

SUMMARY OF THE INVENTION

A first aspect of the present disclosure includes a method of controlling nitric oxides emissions. The method may include producing an exhaust gas stream containing NOx and supplying the exhaust gas stream to an exhaust passage. The method may further include supplying ammonia to the exhaust passage at a location upstream of a first selective catalytic reduction catalyst, wherein the amount of ammonia supplied at the first location is less than about 90% of the effective amount of ammonia needed for reduction of all NOx at the first location. Further, ammonia may be supplied to the exhaust passage at a second location downstream of the first selective catalytic reduction catalyst and upstream of a second selective catalytic reduction catalyst.

A second aspect of the present disclosure includes a selective catalytic reduction system. The system may comprise an exhaust passage, a first selective catalytic reduction catalyst in fluid communication with the exhaust passage, and a second selective catalytic reduction catalyst disposed downstream of the first selective catalytic reduction catalyst and in fluid communication with the exhaust passage. The system may further include an ammonia production system configured to supply ammonia to the exhaust passage at a location upstream of at least one of the first selective catalytic reduction catalyst and the second selective catalytic reduction catalyst.

A third aspect of the present disclosure includes a NOx-emissions control system. The system may comprise an engine configured to produce a NOx-containing exhaust gas stream and an exhaust passage configured to receive the NOx-containing exhaust gas stream. A first selective catalytic reduction catalyst may be in fluid communication with the exhaust passage, and a second selective catalytic reduction catalyst may be disposed downstream of the first selective catalytic reduction catalyst and in fluid communication with the exhaust passage. An ammonia production system may be configured to supply ammonia to the exhaust passage at a first location upstream of the first selective catalytic reduction catalyst. A control unit may be configured to monitor the amount of NOx produced by the engine and the amount of ammonia supplied by the ammonia production system and to control the amount of ammonia supplied at the first location and the amount of NOx at the first location.

BRIEF DESCRIPTION OF THE DRAWINGS

The accompanying drawings, which are incorporated in and constitute a part of this specification, illustrate exemplary embodiments of the disclosure and, together with the written description, serve to explain the principles of the disclosed system. In the drawings.

DETAILED DESCRIPTION

Figure 1:
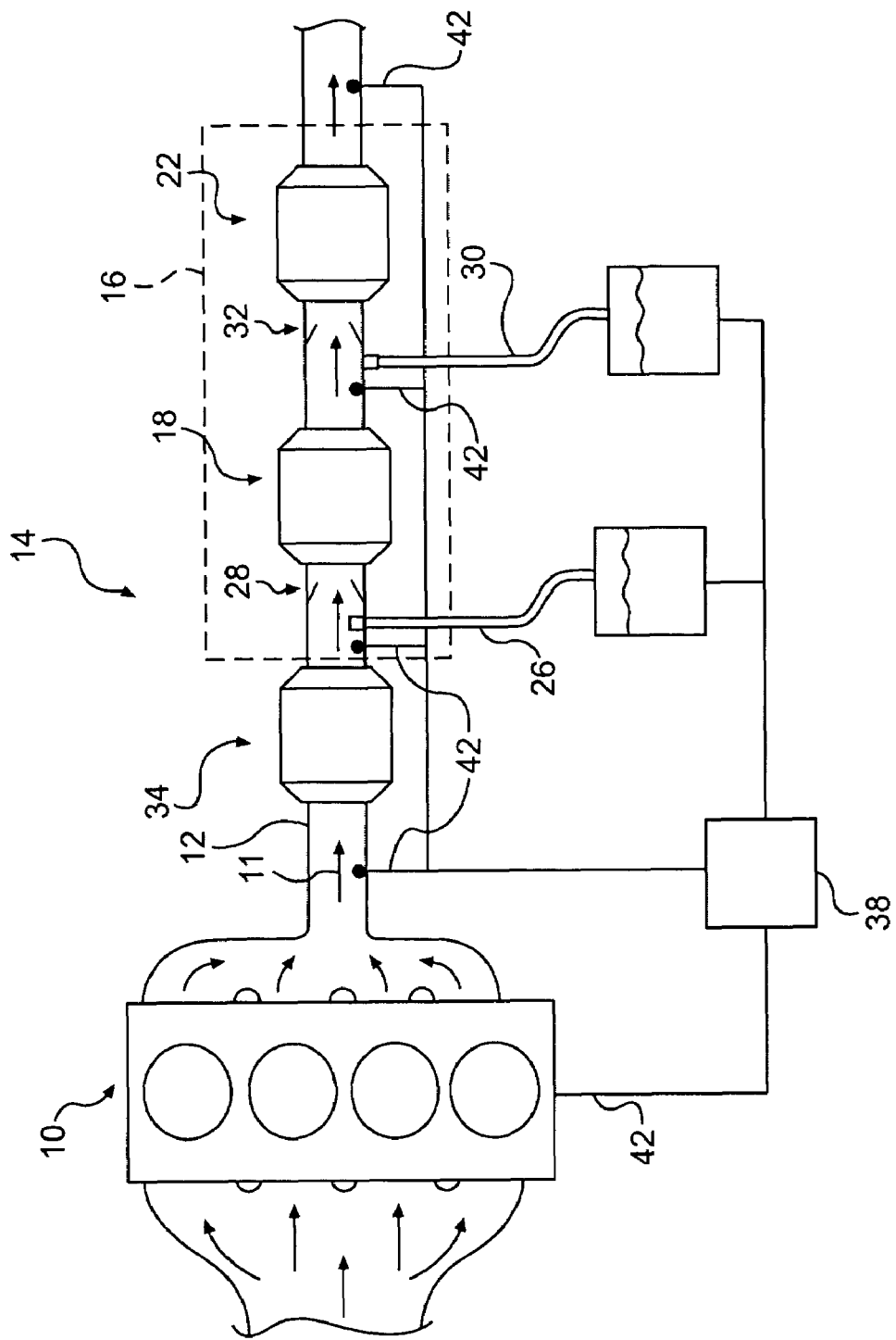
FIG. 1 illustrates an engine and exhaust system including a selective catalytic reduction system, according to an exemplary disclosed embodiment.

FIG. 1 illustrates an engine 10 and exhaust system 14 including a selective catalytic reduction (SCR) system 16, according to an exemplary disclosed embodiment. Combustion within engine 10 may produce a NOx-containing exhaust gas stream 11, which may flow into an exhaust passage 12 of exhaust system 14. Exhaust stream 11 may flow downstream toward catalysts 18, 22 of SCR system 16.

SCR system 16 may include multiple SCR catalysts 18, 22 and multiple ammonia supply systems 26, 30. As shown, first SCR catalyst 18 and second SCR catalyst 22 may be in fluid communication with exhaust passage 12, and second SCR catalyst 22 may be disposed downstream of first SCR catalyst 18. Further, first ammonia supply system 26 may be configured to supply ammonia to exhaust passage 12 upstream of first SCR catalyst 18, and second ammonia supply system 30 may be configured to supply ammonia to exhaust passage 12 downstream of first SCR catalyst 18 and upstream of second SCR catalyst 22.

SCR catalysts 18, 22 may include a variety of different catalyst types. For example, a variety of different catalyst substrate materials, wash coat compositions, and structures may be selected. The specific catalyst types may be selected based on cost, desired operating temperature range, the amount of NOx expected to be produced during use, and/or any other suitable factor. Further, first SCR catalyst 18 and second SCR catalyst 22 may include different catalyst types.

Figure 2:
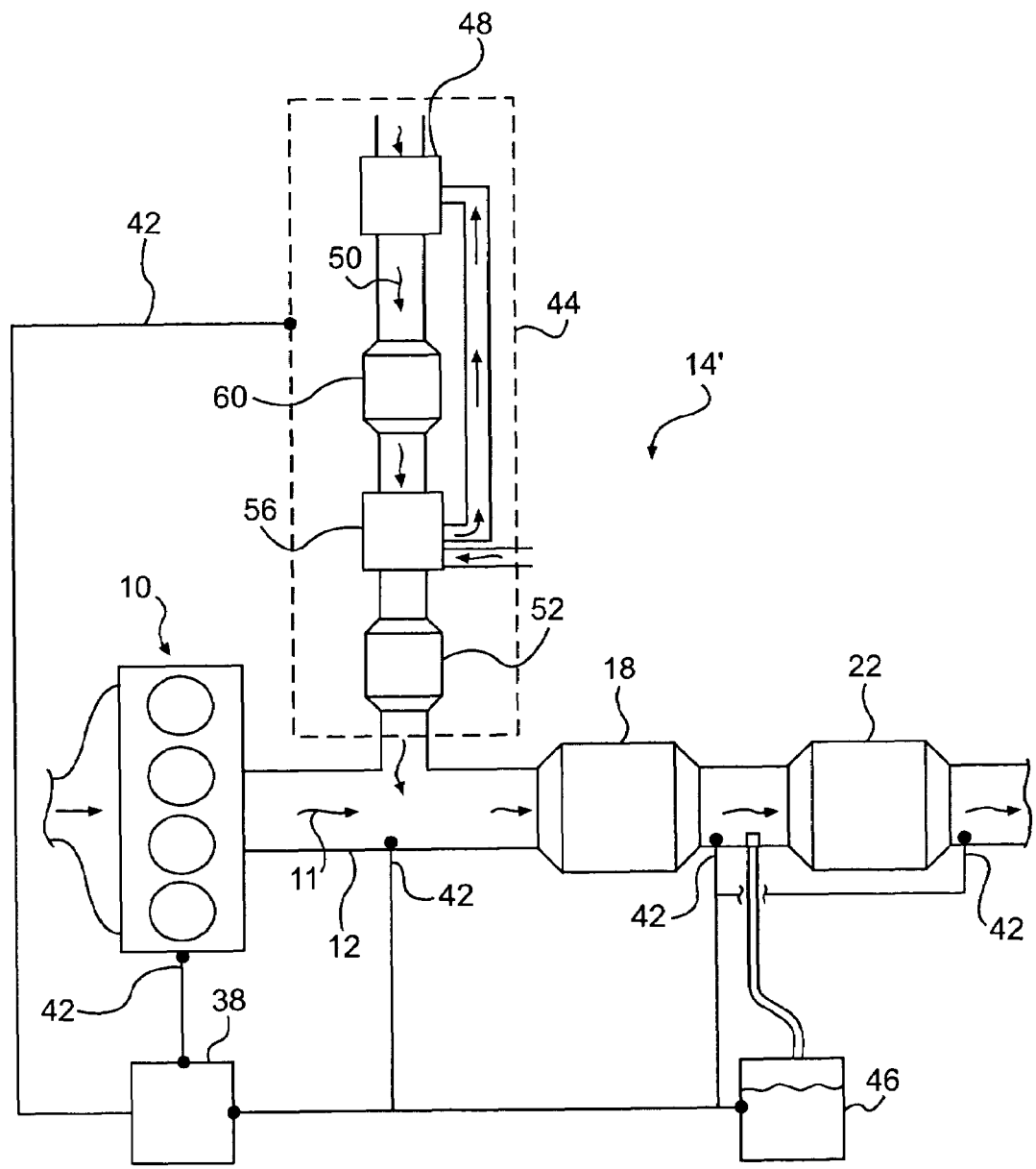
FIG. 2 illustrates an engine and exhaust system including a selective catalytic reduction system with on-board ammonia production, according to an exemplary disclosed embodiment.
Figure 3:
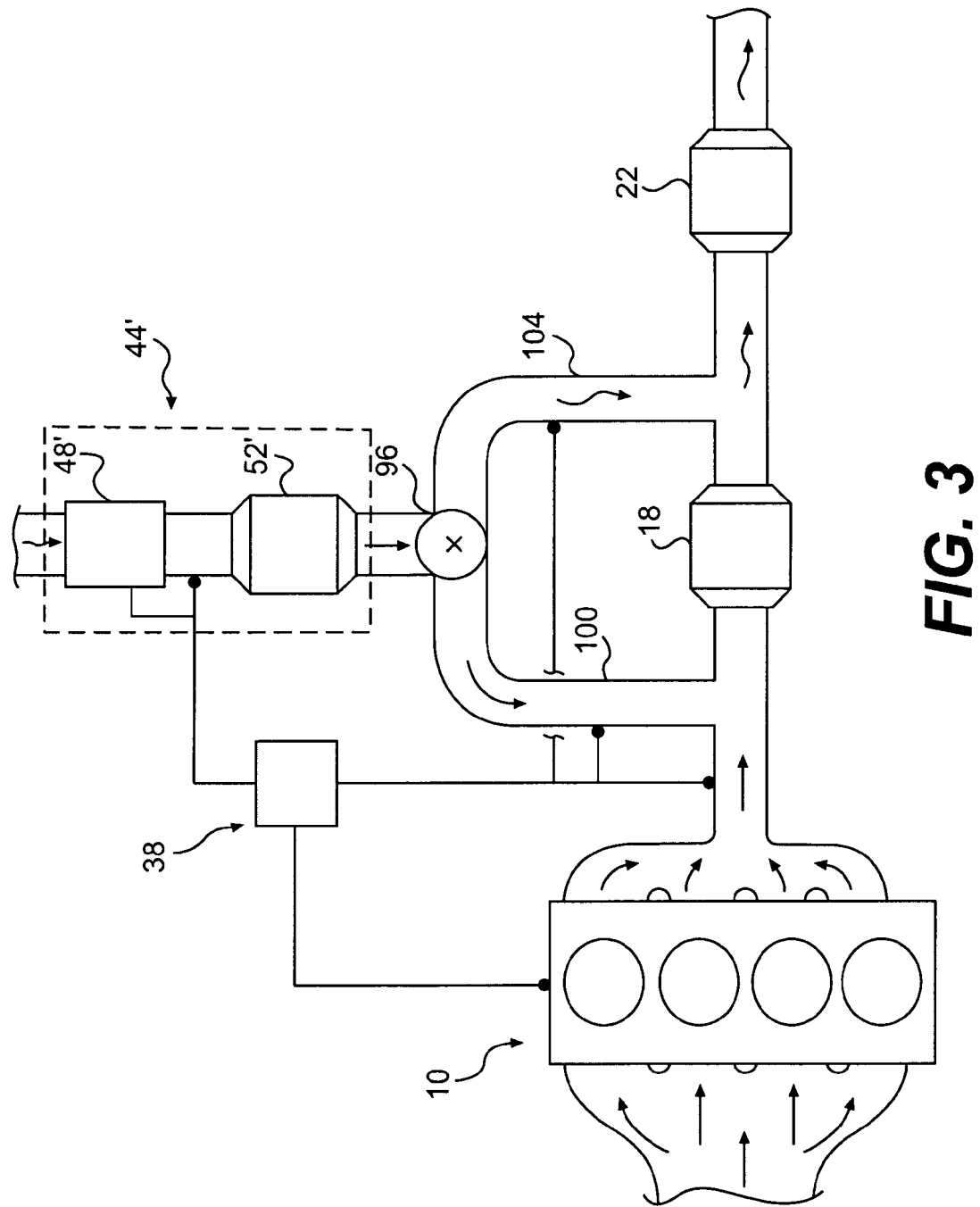
FIG. 3 illustrates an engine and exhaust system including a selective catalytic reduction system with on-board ammonia production, according to another exemplary disclosed embodiment.
Figure 4:
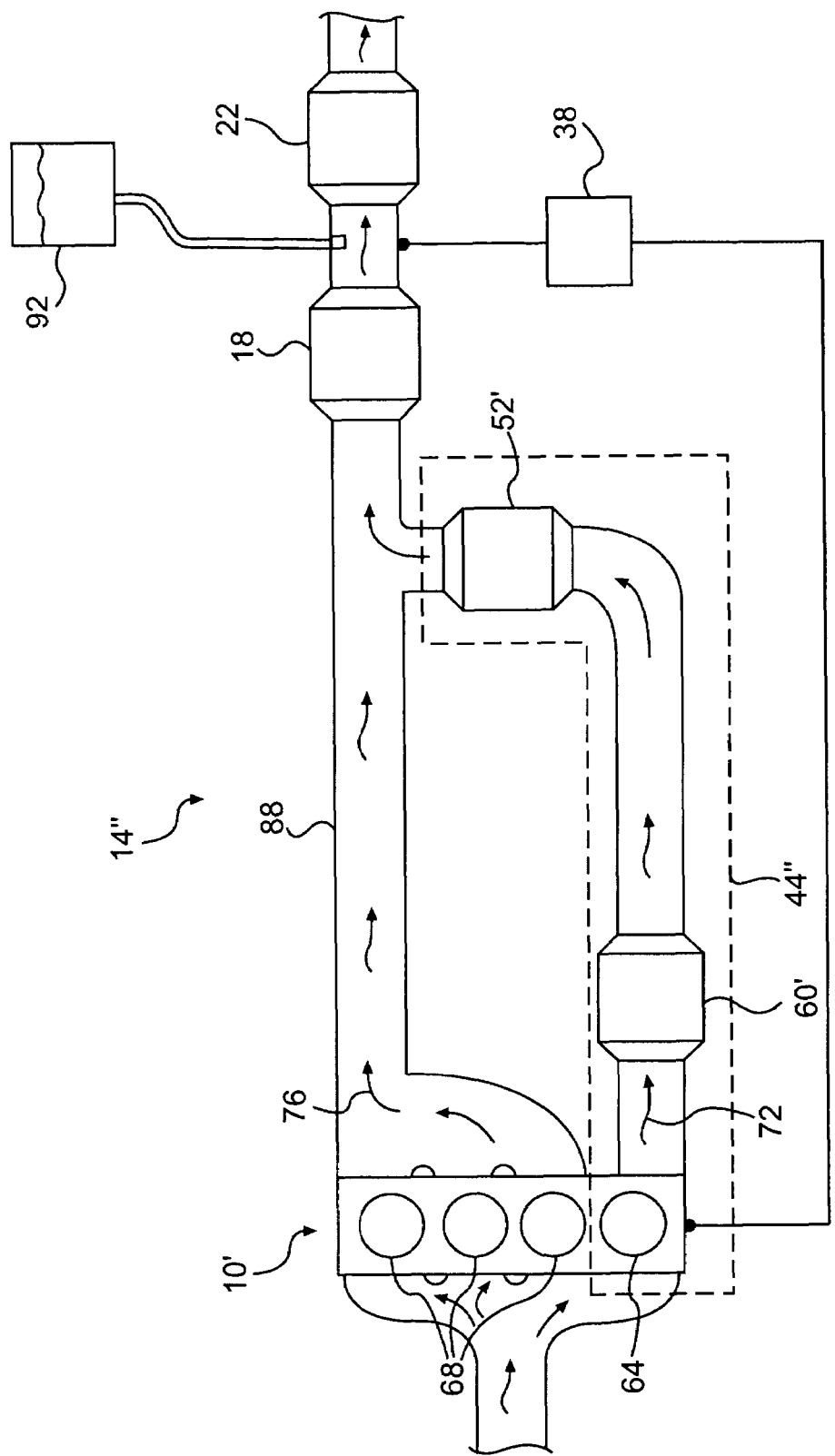
FIG. 4 illustrates an engine and exhaust system including a selective catalytic reduction system with on-board ammonia production, according to another exemplary disclosed embodiment.

Ammonia supply systems 26, 30 may include a variety of suitable ammonia supply systems. For example, as shown in FIG. 1, ammonia supply systems 26, 30 include two liquid injectors. As shown, the liquid injectors may be configured to supply liquid urea to exhaust passage 12, where it may be converted to ammonia. In other embodiments, at least one ammonia supply system 26, 30 may include an on-board ammonia production system, as shown in FIGS. 2-4.

Ammonia supply systems 26, 30 may be configured to facilitate mixing of ammonia and/or urea with exhaust gas stream 11. For example, ammonia supply systems 26, 30 may include injection systems that are distributed around the periphery of exhaust passage 12. Alternatively or additionally, exhaust passage 12 may include other suitable mixing systems. For example, exhaust passage 12 may include one or more sets of mixing vanes 28, 32, grates, a perforated plenum, or other suitable structure to facilitate mixing of ammonia with exhaust gas stream 11.

In some embodiments, first ammonia supply system 26 may be configured to supply an amount of ammonia that is less than the effective amount of ammonia needed for removal of all NOx at first SCR catalyst 18. For example, in some embodiments, first ammonia supply system 26 may be configured to supply less than about 90% of the effective amount of ammonia, less than about 80% of the effective amount of ammonia, less than about 70% of the effective amount of ammonia, or less than about 60% of the effective amount of ammonia. By using less than the effective amount of ammonia at first SCR catalyst 18, most or all of the ammonia will react with NOx, thereby preventing costly waste and/or release of ammonia.

The effective amount of ammonia may be considered to be the amount of ammonia needed to reduce all of the NOx within the exhaust gas if the ammonia reacts only with NOx and is not converted to another chemical species and/or made unavailable for reaction with NOx. For example, in some embodiments, the effective amount of ammonia will be the stoichiometric amount of ammonia needed for reduction of all NOx within the exhaust gas, and ammonia supply systems 26, 30 may be configured to supply less than the stoichiometric amount of ammonia needed for reduction of all NOx. This embodiment may be selected when nearly all the ammonia is available for reaction with NOx (i.e. none of the NOx reacts with other chemicals and/or is deactivated or made unavailable for reaction).

It should be noted that the NOx in exhaust gas stream 11 can include a number of NOx species. Typically, NOx species may include nitric oxide (NO) and nitrogen dioxide ($NO_2$). Therefore, the stoichiometric amount of ammonia should be considered to be the amount needed to convert all the NO and $NO_2$ into nitrogen and water. Further, if urea is used as the ammonia source, the amount of ammonia provided may be considered to be the amount of ammonia that would be produced from the amount of urea provided. Typically, most or all of the urea will be converted to ammonia. However, under cooler operating conditions, slower ammonia formation from urea may be expected.

In some embodiments, the effective amount of ammonia may be greater than the stoichiometric amount of ammonia needed for reduction of all NOx. For example, at higher temperatures (e.g. greater than 500° C.), partial oxidation of ammonia may occur in SCR catalysts 18, 22, thereby converting the ammonia into other chemicals and rendering some of the ammonia ineffective for reduction of NOx. Therefore, to account for ammonia oxidation, the effective amount of ammonia supplied upstream of SCR catalysts 18, 22 may be greater than the stoichiometric amount of ammonia. For example, if oxidation of about one third of the ammonia occurs, the effective amount of ammonia will equal 150% of the stoichiometric amount of ammonia. This is true because only two thirds of the ammonia supplied upstream of SCR catalysts 18, 22 will be available for reaction with NOx (i.e. two-thirds of 150% is 100% of the stoichiometric amount). In addition, the effective amount of ammonia may be affected by a variety of other conditions, including for example, the presence of other reactive species and/or exhaust system components that may bind ammonia temporarily or permanently.

In some embodiments, second ammonia supply system 30 may also be configured to supply less than the effective amount of ammonia needed for removal of all NOx remaining at second SCR catalyst 22. For example, in some embodiments, second ammonia supply system 30 may be configured to supply less than about 90% of the effective amount of ammonia, less than about 80% of the effective amount of ammonia, less than about 70% of the effective amount of ammonia, or less than about 60% of the effective amount of ammonia.

It should be noted that the amount of NOx at second SCR catalyst 22 may be substantially less than the amount of NOx at first SCR catalyst 18. For example, if 80% of the effective amount of ammonia is provided at first ammonia supply system 26 and 90% conversion is achieved at first SCR catalyst 18, 72% of the NOx will be removed (i.e. converted to nitrogen and water) at first catalyst 18, and 28% will remain. Therefore, a lower amount of ammonia may be supplied at second catalyst 22. If for example, 80% of the effective amount of ammonia is again added, only approximately 22% of the amount provided at first ammonia supply system 26 would be needed. In some embodiments, a less than effective amount of ammonia may be supplied at first supply system 26 and second supply system 30. In other embodiments, a less than stoichiometric amount of ammonia will be supplied upstream of first catalyst 18, and approximately a stoichiometric amount of ammonia will be supplied upstream of second catalyst 22.

As shown, SCR system 16 includes two catalysts 18, 22 and two ammonia supply systems 26, 30. However, any suitable number of catalysts and supply systems may be used. For example, in some embodiments, three catalysts and three ammonia supply systems may be provided in series. The third catalyst may be disposed downstream of second catalyst 22, and the third ammonia supply system may be disposed downstream of second catalyst 22 and upstream of the third catalyst. Since some of the NOx will already be removed by catalytic reduction at first and second catalysts 16, 22, the amount of ammonia or urea supplied by the third ammonia supply system will be less than the amount supplied by either first or second ammonia supply systems 26, 30. Further, in some embodiments, the third ammonia supply system may be configured to supply less than the effective amount of ammonia or urea needed for removal of all the remaining NOx in the exhaust gas stream at the third catalyst. In other embodiments, a less than effective amount of ammonia will be supplied upstream of first catalyst 18 and/or second catalyst 22, and approximately an effective amount of ammonia will be supplied upstream of the third catalyst.

In addition, exhaust system 14 may include additional catalysts, filters, or other exhaust system components to facilitate removal of NOx or to control emissions of any exhaust component. For example, as shown, exhaust system 14 includes an upstream catalyst 34. Upstream catalyst 34 may include for example an oxidation catalyst, which may facilitate removal of certain chemicals and/or help produce an exhaust gas stream composition that will facilitate NOx removal at SCR catalysts 18, 22. Further, exhaust system 14 may include any other suitable exhaust system component, including for example, three way catalysts, additive supply systems, and/or particulate filters.

Engine 10 and exhaust system 14 may further include a control unit 38, which may monitor and/or control the system operation. In some embodiments, control unit 38 may monitor and/or control the amount of NOx produced by engine 10. Control unit 38 may include an electrical control unit, such as on an on-board computer. However, any suitable control unit may be selected. For example, control unit 38 may include a system of mechanically activated valves and/or switches, which may respond to machine operations to control the amount of ammonia supplied by ammonia supply systems 26, 30.

Further, control unit 38 may determine how much ammonia should be supplied by first and/or second ammonia supply systems 26, 30 based on the amount of NOx produced by engine 10. In some embodiments, control unit 38 will estimate how much NOx is produced based on known or measured engine operating parameters. Based on the estimated NOx production, appropriate amounts of ammonia will be supplied. Further, in some embodiments, control unit 38 may control the amount of NOx produced by engine 10. For example, the amount of NOx produced by engine 10 may be controlled by altering air-to-fuel vapor ratios, temperature, combustion strategy, and/or any other suitable engine operating parameter.

In other embodiments, control unit 38 will communicate with one or more exhaust gas monitors 42. For example, exhaust gas monitors 42 may include various sensors, such as oxygen sensors, NOx sensors, temperature sensors, ammonia sensors, and/or any other suitable sensor or monitor that may provide information related to NOx concentrations at various locations within engine 10 and exhaust system 14. Control unit 38 may control the operation of ammonia supply systems 26, 30 based on information provided by sensors 42, thereby allowing appropriate amounts of ammonia to be supplied to exhaust passage 12 to remove NOx without wasting ammonia.

In some embodiments, it may be desirable to produce ammonia during operation of engine 10. For example, during operation of a mobile vehicle, such as a truck, it may be difficult or expensive to store sufficient amounts of ammonia or urea for SCR operations. Therefore, it may be desirable to produce the ammonia using an on-board ammonia production system.

FIG. 2 illustrates an engine 10 and exhaust system 14' including a selective catalytic reduction system with on-board ammonia production. As in the embodiment of FIG. 1, engine 10 may produce a NOx-containing exhaust gas 11 stream, which will flow into an exhaust passage and towards multiple SCR catalysts 18, 22. Further, an ammonia-production system 44 may be configured to supply ammonia to exhaust passage 12 at a location upstream of first SCR catalyst 18, and an ammonia supply system 46 may be configured to supply ammonia to the exhaust gas stream at a location downstream of first SCR catalyst 18 and upstream of second SCR catalyst 22. Further, additional ammonia supply systems and catalysts may be provided.

Ammonia production system 44 may include any suitable ammonia production system. For example, ammonia may be produced from catalytic conversion of NOx to ammonia. Therefore, as shown, ammonia production system 44 may include a NOx source 48 and one or more ammonia producing catalysts 52. NOx source 48 may provide a NOx-containing gas stream, which will flow through ammonia producing catalyst 52. The ammonia produced at ammonia producing catalyst 52 will be mixed with a NOx-containing exhaust gas stream 11 produced by engine 10 so that catalytic removal of NOx can occur at SCR catalysts 18, 22. NOx source 48 may include, for example, an engine, such as a single cylinder engine, configured to burn fuel to produce NOx. NOx source 48 may also include any other suitable NOx source such as a burner or stored NOx supply.

Ammonia producing catalyst 52 may be selected from a number of suitable catalyst types. For example, ammonia producing catalyst 52 may be made from a variety of materials. In one embodiment, ammonia producing catalyst 52 may include at least one of platinum, palladium, rhodium, iridium, copper, chrome, vanadium, titanium, iron, or cesium. Combinations of these materials may be used, and the catalyst material may be chosen based on cost, the type of fuel used, the air-to-fuel vapor ratio desired, or for conformity with environmental standards. The specific type of catalyst may also be selected to control NOx-to-ammonia conversion efficiency. Further, the catalyst may be selected based on the amount of NOx produced by NOx source 48 and/or the catalyst temperature under selected operating conditions.

Catalyst operation may be affected by a variety of different factors. For example, catalyst operation may be affected by the presence of other chemicals in the surrounding exhaust gas, by catalyst temperature, and/or by contamination with exhaust gas chemicals. In some embodiments of the present disclosure, the temperature of ammonia producing catalyst 52 may be controlled by cooling NOx-containing gas stream 50 produced by NOx source 48 using a cooling system 56, such as a turbocharger, an gas-to-air cooler, or a gas-to-water cooler. In addition, the presence of other chemical species in exhaust gas stream 18 may be controlled by controlling the operation of NOx source 48, through the use of an additive supply device, or through the use of one or more additional catalysts 60 located upstream of ammonia producing catalyst 52.

As noted, exhaust system 14' may include ammonia supply system 46 positioned downstream of first SCR catalyst 18 and upstream of second SCR catalyst 22. As shown in FIG. 2, second SCR catalyst 22 includes an injector for supplying liquid urea or ammonia to the exhaust system. Alternatively, second ammonia supply system 46 may include an on-board ammonia production system. For example, FIG. 3 illustrates a second embodiment of an engine 10 and exhaust system with an on-board ammonia production system 44'. As shown, on-board ammonia production system 44' includes a NOx source 48' and ammonia producing catalyst 52'. Further, the system includes two exhaust passages 100, 104 configured to supply ammonia to locations upstream of first SCR catalyst 18 and second SCR catalyst 22. The system further includes a valve system 96 for controlling the flow of ammonia through exhaust passages 100, 104. Alternatively, an exhaust system may include multiple on-board ammonia production systems configured to supply a desired amount of ammonia to selected exhaust system locations.

In some embodiments, a single engine may serve as both a NOx source for ammonia production and as a primary work machine power source. For example, FIG. 4 illustrates another engine 10' and exhaust system 14" including a selective catalytic reduction system with on-board ammonia production, according to an exemplary disclosed embodiment. Single engine 10' may serve as a NOx source for on-board ammonia production and as a machine power source. Engine 10' may include a first cylinder group 64 and a second cylinder group 68. First cylinder group 64 may produce a first NOx-containing exhaust gas stream 72, which may be used to produce ammonia by an ammonia production system 44". Second cylinder group 68 will produce a second NOx-containing exhaust gas stream 76. First cylinder group 64 and second cylinder group 68 may both contribute to the total engine power for a work machine, such as a truck.

As noted, first cylinder group 64 and second cylinder group 68 may be located on a single engine 10'. As shown, first cylinder group 64 includes a single cylinder, and second cylinder group 68 includes three cylinders. However, first and second cylinder groups 64, 68 may include any suitable number of cylinders.

First cylinder group 64 and second cylinder group 68 may have different operational characteristics. For example, first cylinder group 64 may have different air-to-fuel ratios, may employ a different combustion strategy, may include an exhaust gas additive supply device, may have different compression ratios, may have different cylinder sizes, may include a different number of cylinders, and/or may operate at different temperatures than second cylinder group 68. In some embodiments, first cylinder group 64 may be configured to maximize NOx production for a given quantity of fuel used, thereby increasing ammonia production by ammonia production system 44".

NOx-containing exhaust gas stream 76 from second cylinder group 68 may flow into an exhaust passage 88. Further, as shown, on-board ammonia production system 44" is configured to supply ammonia to exhaust passage 88 upstream of first SCR catalyst 18. Further, an ammonia supply system 92 may be configured to supply ammonia to exhaust passage 88 at a location downstream of first SCR catalyst 18 and upstream of second SCR catalyst 22. In other embodiments, ammonia production system 44" may be configured to supply ammonia to exhaust passage 88 at multiple locations using a branched exhaust passage with systems for controlling exhaust flow. Alternatively, multiple ammonia production systems may be used at locations upstream of first SCR catalyst 18, and/or upstream of second SCR catalyst 22 and downstream of first SCR catalyst 18.

It should be noted that SCR systems including on-board ammonia production systems, as shown in FIG. 2-4, may also be controlled by a control unit 38. As described in reference to FIG. 1, control unit 38 may communicate with a number of exhaust monitors 42 configured to provide information related to exhaust gas conditions, such as temperature, oxygen concentration, NOx concentration, and/or ammonia production.

In addition, as noted previously, on-board ammonia production systems 44, 44', 44" may serve as an ammonia supply system for SCR catalysts 18, 22. In some embodiments of the present disclosure, on-board ammonia production systems may be configured to supply less than the effective amount of ammonia needed for NOx removal at selected locations within an exhaust systems. For example, as noted in reference to FIG. 1, ammonia production systems 44, 44', 44" may be configured to supply less than about 90% of the effective amount of ammonia, less than about 80% of the effective amount of ammonia, less than about 70% of the effective amount of ammonia, or less than about 60% of the effective amount of ammonia.

INDUSTRIAL APPLICABILITY

The present disclosure provides an exhaust-gas emissions control system with multi-stage injectors for SCR systems. This system may be useful in all exhaust systems that require SCR.

SCR systems may provide an effective method for controlling NOx-emissions, while maintaining high fuel efficiency. However, SCR systems require ammonia, which may be provided by on-board production of ammonia or storage of ammonia or urea. On-board production of ammonia may consume a significant amount of fuel and/or other chemicals, which will detract from an engine's overall fuel efficiency and cost effectiveness. Further, storage of ammonia or urea for later injection can be expensive or hazardous. In addition, there is currently no adequate infrastructure to supply urea or ammonia for storage and consumption by highway vehicles.

The system of the present disclosure may provide higher NOx conversion efficiency than single-catalyst SCR systems. Generally, more fuel efficient engine operation will produce a higher level of NOx. Therefore, higher NOx conversion efficiencies by multi-stage SCR systems will allow engines to be operated more efficiently, while maintaining suitable NOx emissions levels. This will provide good control of NOx emissions, while decreasing the cost of fuel for engine operation.

In addition, the system of the present disclosure may improve NOx-emissions control using SCR systems, while also reducing the amount of ammonia or urea needed for SCR operation. The system includes a multi-stage ammonia supply and catalyst system having two or more ammonia supply systems and SCR catalysts in series. Since NOx reduction by SCR may be limited by the ability to mix ammonia with a NOx-containing exhaust gas stream and/or catalyst efficiency, at least one of the ammonia supply systems of the present disclosure may be configured to supply less than the effective amount of ammonia needed for NOx removal. Subsequently, the one or more downstream ammonia supply systems and SCR catalysts will remove additional NOx. The multi-stage system will remove a substantial amount of NOx with little risk of using excess ammonia or urea. This will provide good control of NOx emissions, while minimizing the cost of SCR operation.

It will be apparent to those skilled in the art that various modifications and variations can be made in the disclosed systems and methods without departing from the scope of the disclosure. Other embodiments of the disclosed systems and methods will be apparent to those skilled in the art from consideration of the specification and practice of the embodiments disclosed herein. It is intended that the specification and examples be considered as exemplary only, with a true scope of the disclosure being indicated by the following claims and their equivalents.

What is claimed is:

1. A method of controlling nitric oxides emissions, comprising:

producing an exhaust gas stream containing NOx;

supplying the exhaust gas stream to an exhaust passage;

producing a second exhaust gas stream containing NOx by combustion of a fuel within at least one engine cylinder and converting at least a portion of the NOx in the second exhaust gas stream into ammonia to produce an ammonia-containing exhaust gas stream;

supplying the ammonia-containing exhaust gas stream to the exhaust passage at a location upstream of a first selective catalytic reduction catalyst, wherein the amount of ammonia supplied at the first location is less than about 90% of the effective amount of ammonia needed for reduction of all NOx at the first location; and supplying urea to the exhaust passage at a second location downstream of the first selective catalytic reduction catalyst and upstream of a second selective catalytic reduction catalyst.

2. The method of claim 1, wherein the amount of urea supplied at the second location is less than about 90% of the effective amount of urea needed for reduction of all NOx at the second location.

3. The method of claim 1, wherein the amount of ammonia supplied at the first location is less than about 80% of the effective amount of ammonia needed for reduction of all NOx at the first location.

4. The method of claim 3, wherein the amount of urea supplied at the second location is less than about 80% of the effective amount of urea needed for reduction of all NOx at the second location.

5. The method of claim 1, wherein the amount of ammonia supplied at the first location is less than about 70% of the effective amount of ammonia needed for reduction of all NOx at the first location.

6. The method of claim 1, wherein the effective amount of ammonia is the stoichiometric amount of ammonia for complete reduction of NOx.

7. The method of claim 1, further including supplying ammonia to the exhaust passage at a third location downstream of the second selective catalytic reduction catalyst and upstream of a third selective catalytic reduction catalyst.

8. A selective catalytic reduction system, comprising:
an exhaust passage;
a first selective catalytic reduction catalyst in fluid communication with the exhaust passage;
a second selective catalytic reduction catalyst disposed downstream of the first selective catalytic reduction catalyst and in fluid communication with the exhaust passage;
an ammonia production system including at least one cylinder of an engine configured to produce a NOx-containing exhaust gas stream and at least one catalyst configured to convert at least a portion of the NOx in the NOx-containing exhaust gas stream into ammonia, the ammonia production system being configured to supply ammonia to the exhaust passage at a first location upstream of the first selective catalytic reduction catalyst such that the amount of ammonia supplied at the first location is less than about 90% of the effective amount of ammonia needed for reduction of all NOx in the exhaust passage; and
a urea supply system configured to supply urea at a second location upstream of the second selective catalytic reduction catalyst and downstream of the first selective catalytic reduction catalyst.

9. The system of claim 8, wherein the ammonia production system further includes an ammonia producing catalyst configured to convert at least a portion of the NOx in the NOx-containing exhaust gas stream into ammonia.

10. The system of claim 9, further including at least one oxidation catalyst upstream of the ammonia producing catalyst.

11. The system of claim 9, further including an exhaust gas cooling system upstream of the ammonia producing catalyst.

12. The system of claim 8, further including a third selective catalytic reduction catalyst disposed downstream of the second selective catalytic reduction catalyst.

13. The system of claim 8, wherein the ammonia production system is configured to supply ammonia to the exhaust passage at a position upstream of the first selective catalytic reduction catalyst such that the amount of ammonia supplied at is less than about 80% of the effective amount of ammonia needed for reduction of all NOx in the exhaust passage.

14. The system of claim 8, further including at least one mixing system configured to mix the ammonia and an exhaust gas stream flowing through the exhaust passage.

15. The system of claim 8, wherein the effective amount of ammonia is the stoichiometric amount of ammonia for complete reduction of NOx.

16. A NOx-emissions control system, comprising:
an engine configured to produce a NOx-containing exhaust gas stream;
an exhaust passage configured to receive the NOx-containing exhaust gas stream;
a first selective catalytic reduction catalyst in fluid communication with the exhaust passage;
a second selective catalytic reduction catalyst disposed downstream of the first selective catalytic reduction catalyst and in fluid communication with the exhaust passage;
an ammonia production system including at least one cylinder of an engine configured to produce a NOx-containing exhaust gas stream, the ammonia production system being configured to supply ammonia to the exhaust passage at a first location upstream of the first selective catalytic reduction catalyst;
a liquid injector configured to supply a liquid that can be at least partially converted to ammonia at a second location upstream of the second selective catalytic reduction catalyst and downstream of the first selective catalytic reduction catalyst; and
a control unit configured to monitor the amount of NOx produced by the engine and the amount of ammonia supplied by the ammonia production system and to control the amount of ammonia supplied at the first location and the amount of NOx at the first location.

17. The system of claim 16, wherein the control unit is configured to control the amount of ammonia supplied at the first location and the amount of NOx at the first location such that the amount of ammonia is less than about 90% of the effective amount of ammonia needed for reduction of all NOx at the first location.

* * * * *